Nov. 27, 1956  C. H. GRANT  2,772,058
AIRCRAFT WING WITH MEANS TO INCREASE
LIFT THROUGH CONTROL OF AIR FLOW
Filed May 10, 1951  4 Sheets-Sheet 1
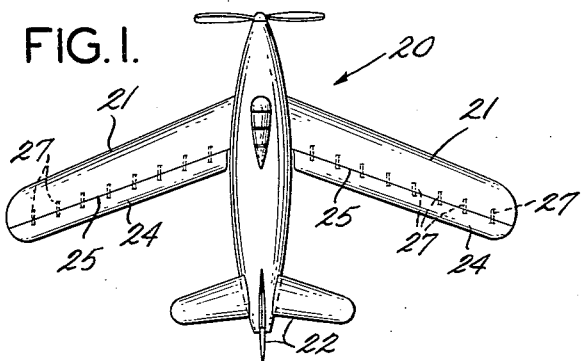
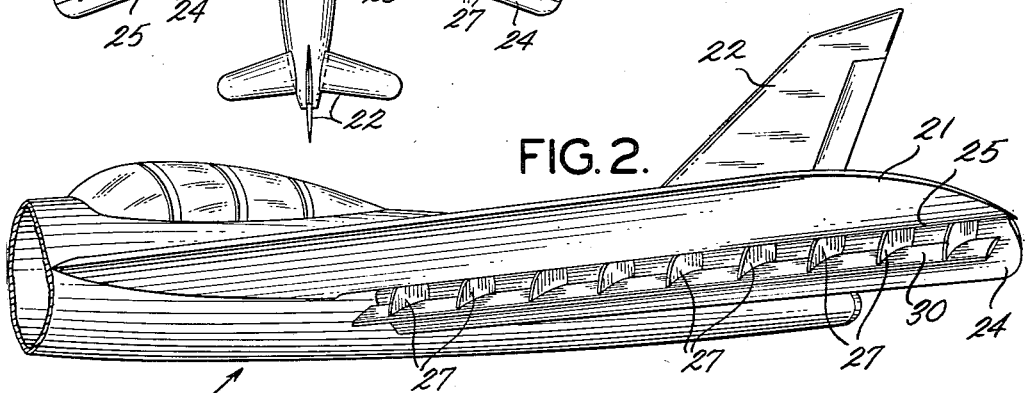
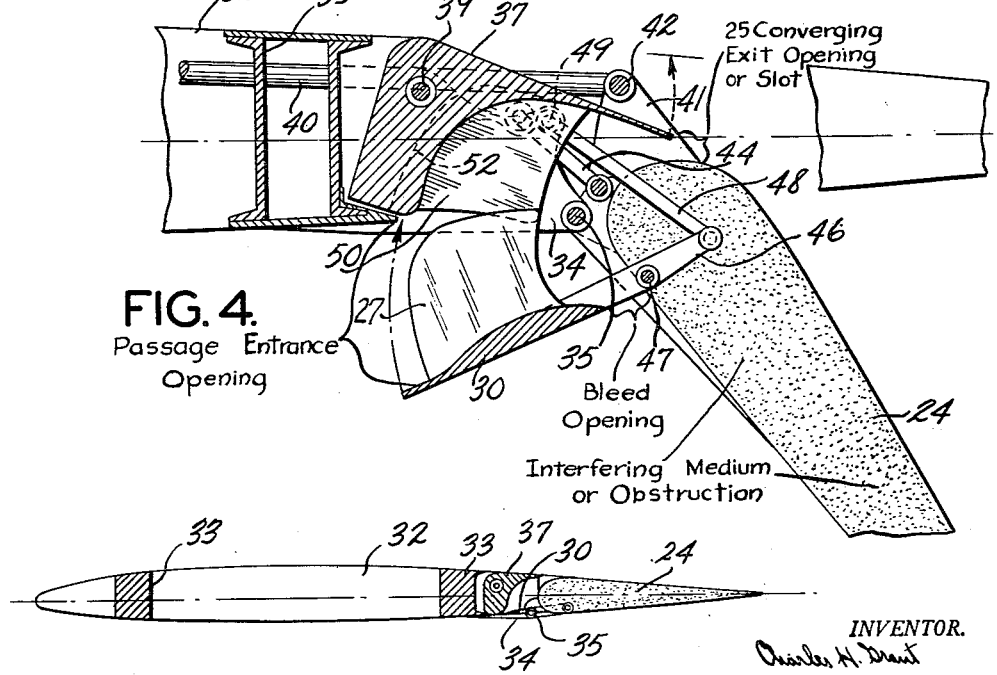

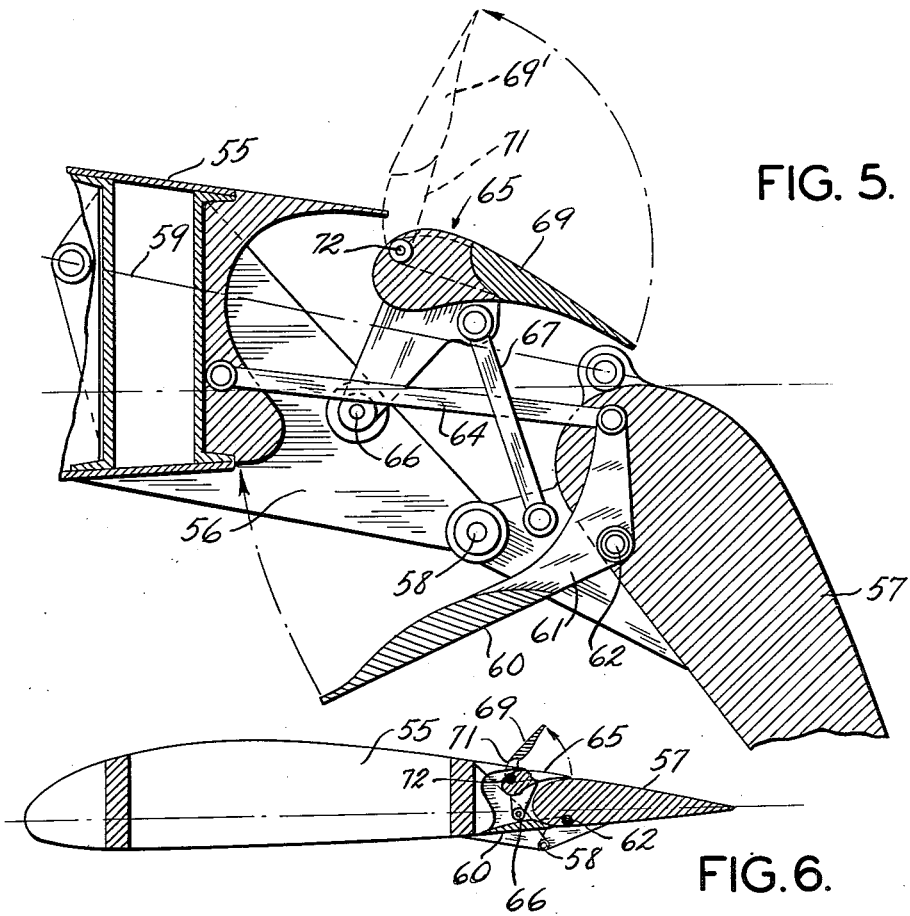
FIG. 5.
FIG. 6.
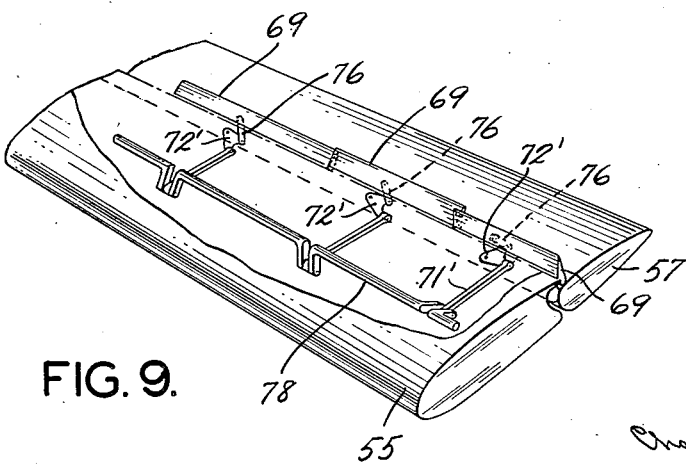
FIG. 9.

Nov. 27, 1956 C. H. GRANT 2,772,058
AIRCRAFT WING WITH MEANS TO INCREASE
LIFT THROUGH CONTROL OF AIR FLOW
Filed May 10, 1951 4 Sheets-Sheet 3
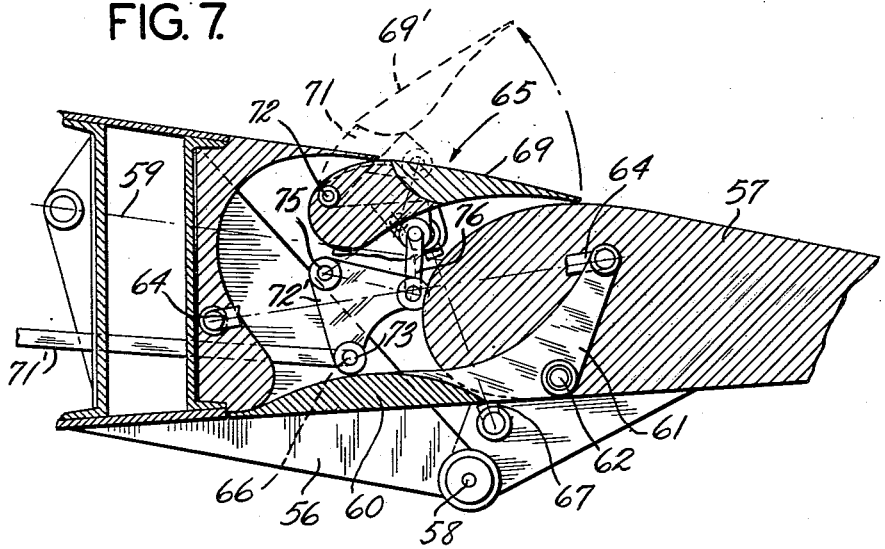
FIG. 7.
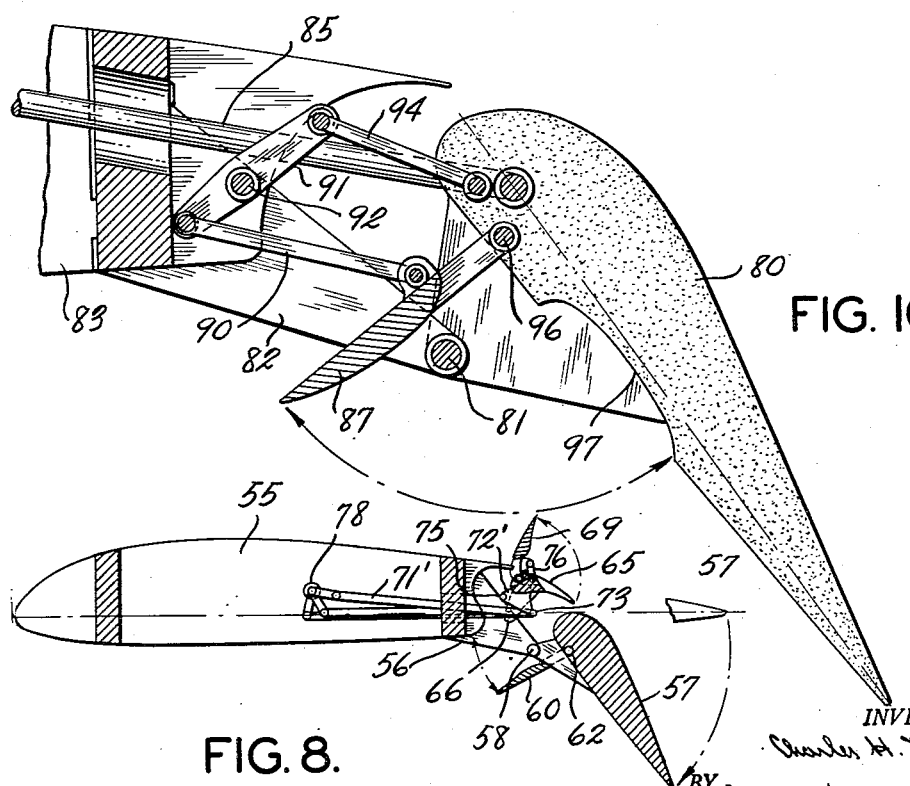
FIG. 10.
FIG. 8.
INVENTOR.
Charles H. Grant
BY Emery, Varney,
Whittemore + Dix
ATTORNEYS.

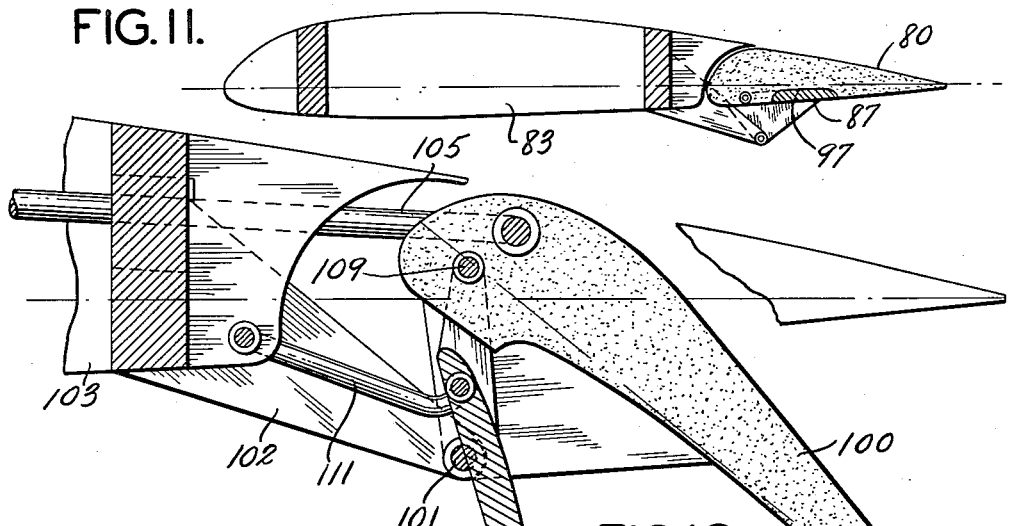
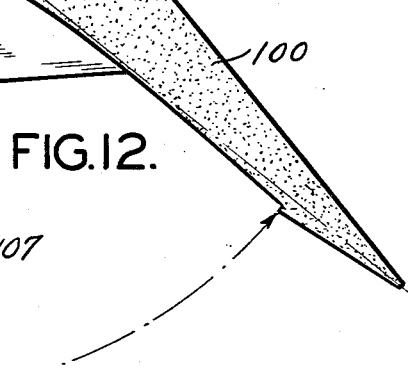
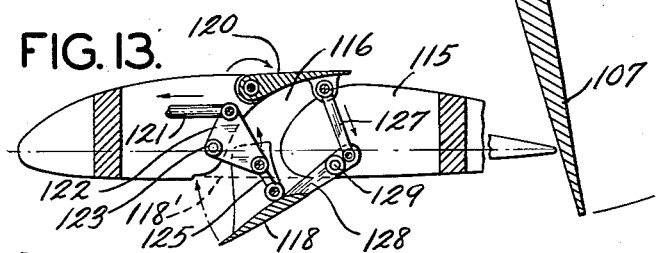
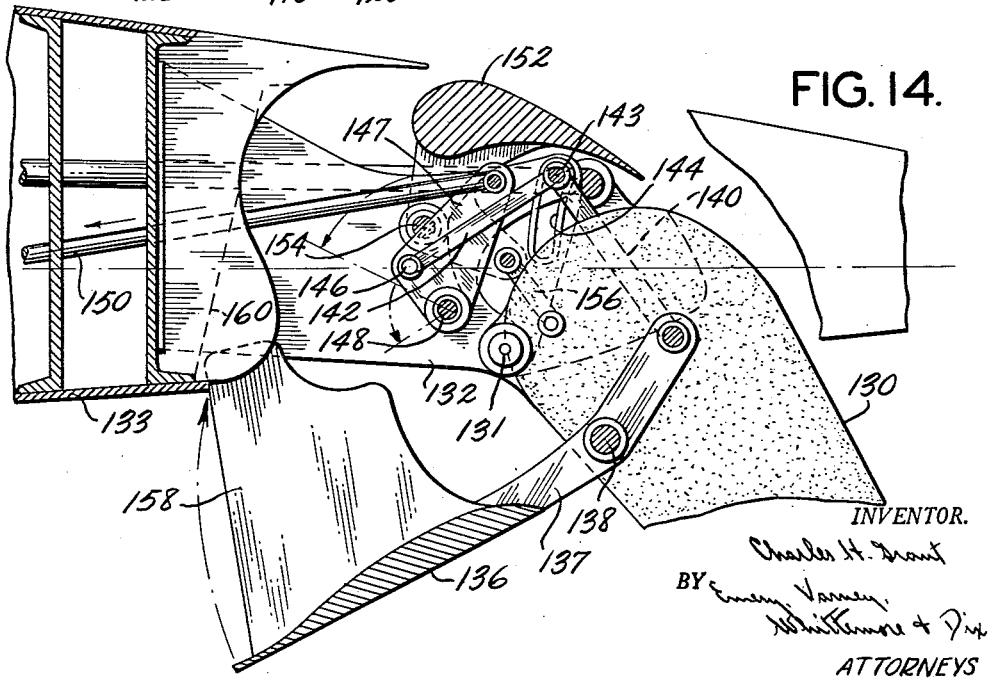

United States Patent Office 2,772,058
Patented Nov. 27, 1956

2,772,058

AIRCRAFT WING WITH MEANS TO INCREASE LIFT THROUGH CONTROL OF AIR FLOW

Charles H. Grant, New Rochelle, N. Y.

Application May 10, 1951, Serial No. 225,609

11 Claims. (Cl. 244—42)

This invention relates to aircraft wings having spanwise extending slots. It is the general object of the invention to obtain increased velocity and volume of air flow that passes from the under side to the upper side of a wing, through an opening in the wing. Two more particular objectives are to produce an increase in air velocity and pressure within the slot and to prevent tipwise flow of air through slots and over flaps that are employed on swept-back wings. It is another object of the invention to provide an improved slot controller.

The invention is intended primarily for application to wings with slots and with or without trailing edge flaps. In effect it is a means to increase the velocity and volume of airflow into a slot and therewith increase the pressure of air within the slot so that a greater velocity and volume of air will be driven out from the slot exit and over the upper surface of the wing that lies rearward of the slot. Through this means of increasing the exit jet flow over the wing (the rearward wing part may be a flap lift), generated by this rearward wing part, is increased.

Slots in wings with or without flaps, function to increase lift in lieu of the normal pressure beneath the wing and slot entrance or to increase pressure created at the slot entrance by depression of a wing flap rearward of the slot. The velocity and volume of air ejected from the slot and over the wing or flap to produce lift is dependent upon the air pressure at the slot entrance. This invention provides, in effect, an air pump below the slot.

This invention then consists of any auxiliary means of increasing the air pressure at the slot entrance and of directing the airflow up through the slot and over the wing or flap rearward of the slot in an effective manner. In general it takes the form of a combination of: 1, a passage entrance into which air passes in considerable volume, as shown in Figure 4. This may be formed between an appropriately shaped lower-forward lip of the wing slot entrance and an auxiliary surface or body located beneath it: 2, an interfering medium lying in the path of the air flowing through the passage, and which medium causes deflection of this air flow and resulting pressure at the points of deflection: 3, a slot or slots leading from the points of pressure to the upper surface of the wing, the exit of which is formed to increase the velocity of the airflow passing out of it and to direct this airflow approximately parallel to the wing surface rearward of the slot exit: 4, a bleed opening or openings transversely spaced from the center line or center plane of the line of airflow through the passage and on the opposite side of the interfering medium or obstruction from the slot exit, the area of this opening being less than the difference between the cross section of the passage and the cross section of the wing exit opening. In an airplane wing this may take the form of an opening or slot situated between the rear edge of the surface forming the passage entrance, and the under surface of the wing or flap that lies to the rear of the wing slot entrance.

This device, as composed of these features, operates to increase the wing slot pressure. The surface or body beneath the wing slot directs the airflow upward toward the wing slot while the bleed opening allows increased flow out of the inner portion of the passage, thereby increasing the velocity as well as the volume of flow through the passage entrance and against the obstruction that lies in the path of this flow. In this case the obstruction is the leading edge of the flap or of the wing lying to the rear of the wing slot. This increased velocity of flow against the obstruction increases both the amount of kinetic energy released and the air pressure in this region. This pressure in effect is caused by the abrupt change in direction of the air flow due to the obstruction. This increased pressure reacts upward through the slot to increase the airflow from the slot exit jet.

When a flap is depressed rearward of a slot it generates pressure in front of the flap and beneath the wing slot. This pressure forces air upward through the slot. However this pressure is not concentrated at the slot entrance and only a small part of the airflow beneath the wing is available for flow up through the slot.

In this device the flow deflector directs or steers the flow to the slot entrance, and the bleed slot insures an increased velocity and volume of flow to produce increased pressure at the slot entrance. In effect it changes velocity head to pressure head, using part of the air volume taken in at the passage entrance due to the bleed slot to increase the pressure within the slot.

Although a specific form and position of features composing this invention is shown here, it is to be understood that other forms, positions and arrangements are envisioned and anticipated. It is understood that the basic factors composing this invention can be put together in many ways to produce the effects indicated and resulting high velocity flow from the passage exit. For instance the required and specified mechanical features may be shaped and arranged to create an air pump for a pressure tank, or a pressurizing device for the blower chamber of a jet engine. It may be used in any case where a large volume of flow of gas or liquid is available to produce a flow of higher velocity but of lesser volume, or where the flow approaching a slot is at an angle to the slot. In the latter instance, the vertical guide plates within and at the entrance of the slot, straighten the flow so that it passes up through the slot effectively at right angles to the slot lateral axis, and down over the flap at an angle more nearly parallel to the flap chord than otherwise would be the case. This will increase the lift materially. When the airflow passes through the slot and over the flap at less than 90° to the slot lateral axis and flap chord, resulting lift is reduced greatly; the larger the angle between the flow and the flap chord, the greater is this reduction.

Other objects, features and advantages of the invention will appear or be pointed out as the description proceeds.

In the drawing, forming a part hereof, in which like reference characters indicate corresponding parts in all the views, Fig. 1 is a diagrammatic top plan view of an airplane with a swept-back wing and slot, and with guide plates located in the slot in accordance with this invention, Fig. 2 is a perspective view of the airplane shown in Fig. 1, the view being taken from below the level of the wing, and with the deflector and flap depressed, Fig. 3 is a diagrammatic chordwise section through the wing of Fig. 2 with the flap in raised position, Fig. 4 is an enlarged view of a portion of the wing shown in Fig. 3 with the flap and deflector in depressed positions, Fig. 5 is a view similar to Fig. 4 but showing a modified construction with a slot controller that produces a double slot when the flap is depressed, Fig. 6 is a diagrammatic chordwise sectional view of a wing including the modified construction shown in Fig. 5, and with the flap and deflector in their raised positions and with the spoiler in elevated position, Fig. 7 is a sectional view of the wing structure of Figs. 5 to 7 showing the spoiler operating mechanism, Fig. 8 is a reduced scale view of the spoiler operating mechanism of Fig. 7 with the parts in different positions, Fig. 9 is a perspective view of the wing shown in Figs. 5 to 8 illustrating the way in which successive spoilers are elevated in a desired sequence, Fig. 10 is an enlarged sectional view of another modified form of the invention in which the deflector is contained within the flap when not in use, Fig. 11 is a reduced sectional view of the modified structure shown in Fig. 10 in combination with the entire airfoil section, Fig. 12 is a view similar to Fig. 11 but showing still another modified form of the invention in which the deflector fits into a depression in the slot when not in use, Fig. 13 is a chordwise sectional view showing another modified form of the invention applied to an airfoil section having a slot and no flap, Fig. 14 is a sectional view showing another modified form of the invention in which the deflector and its attached guide plates are controlled independently of the depression of the flap.

Fig. 1 shows an airplane 20 having swept back wings 21 and a tail 22. Each of the wings 21 has a flap 24 and a slot 25 that is open between the flap and the forward portion of the wing when the flap is depressed. At spaced regions along the slot there are guide plates 27 for preventing tipwise movement of the air that flows upward through the slot from the lower to the upper surface of the wing. These guide plates 27 extend in substantially the direction of flight of the aircraft, and they restrain the air against the tipwise movement which has reduced the efficiency of swept back slots and flaps in aircraft of the prior art.

Fig. 2 shows one of the wings 21 with a deflector 30 extending along the length of the swept back slot 25 and extending downwardly to a level lower than the bottom surface of the wing and below the slot. This increases the pressure under the slot and the increase in pressure causes a greater volume of air to pass upward through the slot with resulting higher velocity of the air and increased lift when the flap is depressed.

In the construction shown in Fig. 2, the guide plates 27 are carried by the deflector 30, and as the deflector is raised, the guide plates 27 move upwardly into the slot between the flap 24 and the forward section of the wing. When the deflector 30 is fully raised, it serves as a gate to close the slot and it forms a continuation of the bottom surface of the wing.

Fig. 3 is a sectional view through the wing 21. This wing or airfoil has a rigid forward portion 32 with spars 33 and with a bracket 34 which extends rearwardly from the rearward spar 33 to support the flap 24. The flap has a forwardly extending bracket that is connected to the bracket 34 by a pivot 35 about which the flap 24 swings as it moves between its raised and depressed positions. It will be understood that in the construction illustrated in Fig. 3, and in subsequent figures of the drawing, there are other brackets with pivots spaced from one another along the spanwise extent of the slot to complete the hinge connection between the flap and the forward portion of the wing.

When the flap 24 is in raised position, a slot controller 37 closes the upper end of the slot.

Fig. 4 shows a portion of the structure of Fig. 3 on a greatly enlarged scale, and this view includes the links by which the different parts are operated. The slot controller 37 is connected to the forward portion 32 of the wing by a spanwise extending pivot 39 about which the slot controller swings from the position shown in Fig. 3 to that shown in Fig. 4, as the flap 24 is depressed. There is an operating rod 40 extending rearwardly from the rigid forward section 32 to a bracket 41 at the leading edge of the flap 24. The operating rod 40 is connected to the bracket 41 by a pivot 42 located at a substantial distance above the pivot 35 on which the flap 24 is hinged to the forward portion of the wing. Forward and rearward movement of the operating rod 40 raises and depresses the flap 24 under the control of the pilot.

The slot controller 37 is connected to the flap 24 by a link 44 which rocks the slot controller 37 about its pivot 39 in proportion to the depression of the flap 24. This rocking movement brings the trailing edge of the slot controller 37 downward so that it restricts the outlet at the top of the slot and causes the air stream from the slot to move rearwardly at high velocity over the upper surface of the flap.

The deflector 30 is connected to the flap by a lever 46 which is fastened to the flap 24 by a fulcrum pivot 47. The rearward end of the lever 46 is connected to the bracket 34 by a link 48. The conneciton of link 48 with the bracket 34 is made by means of a pivot 49 located at a substantial distance above the pivots 35 and 47 so that as the flap is depressed, the link 48 pulls the rearward end of the lever 46 upward and rocks it counterclockwise about the fulcrum pivot 47 so that the deflector 30 is moved downwardly in proportion to the depression of the flap.

In addition to the guide plates 27, which are carried by the deflector 30, there are preferably other guide plates 50 carried by the slot controller 37. The guide plates 50 are in staggered relation with the guide plates 27, and preferably close to the guide plates 27, and in position to overlap the plates 27 as shown in Fig. 4. These upper guide plates 50 restrain tipwise movement of the air after it flows upward above the top ends of the guide plates 27. There are slots in the inside of the slot controller 37 for receiving the upper and forward ends of the guide plates 27. These slots are indicated by the dotted line 52 which represents the depth to which the slots extend into the rearward face of the slot controller 37.

It is a feature of the construction illustrated in Fig. 4 that the deflector 30 is connected to the lever 46 at some distance from the pivot 47 so that the trailing edge of the deflector 30 is spaced from the bottom surface of the flap 24 when the deflector is in its depressed position, as shown in Fig. 4. The purpose of this feature is to permit an uninterrupted flow of air under the wing and across the bottom surface of the depressed flap 24. The top surface of the deflector 30 is preferably of fair form so as to reduce or eliminate turbulence of the air stream in the region immediately adjacent to the upper edge of the deflector.

Fig. 5 shows a modified construction in which a rigid forward portion 55 has a bracket 56 to which a flap 57 is connected by a pivot 58. The flap 57 is raised and depressed by an operating rod indicated by the dot and dash line 59, the construction being similar to the operating rod of Fig. 4.

The modified construction shown in Fig. 5 has a deflector 60 carried by a lever 61 which is connected to the flap 57 by a fulcrum pivot 62. The upper end of the lever 61 is connected to the rigid forward section 55 by a link 64 at a substantial distance above the pivot 58 so that as the flap 57 swings about its pivot 58, the link 64 rocks the lever 61 counterclockwise about its fulcrum pivot 62 and moves the deflector 60 into a depressed position.

The aircraft wing of Fig. 5 has a novel slot controller 65 which is supported from the bracket 56 by a pivot 66. This slot controller 65 is connected with the flap 57 by a link 67 which rocks the slot controller rearward and downwardly about its pivot 66 in proportion to the depression of the flap. A rearward portion 69 of the slot controller 65 is movable with respect to the forward portion of the slot controller, and can be lifted upwardly into the dotted line position indicated by the reference character 69'. In this position the rearward portion of the slot controller extends above the top of the wing profile and comprises a spoiler.

The rearward portion or spoiler 69 has a bracket 71, which swings about a pivot 72, and this bracket and pivot connect the spoiler 69 to the remaining portion of the slot controller 65. It is a feature of the construction that the distance from the leading edge of the spoiler 69 to the axis of the pivot 72 is greater than the distance of the axis of the pivot 72 below the top of the wing profile. Because of this, there is a gap between the forward edge of the spoiler 69 and the top surface of the wing when the spoiler is in its raised position 69'. This gap causes the boundary layer of air flowing across the top surface of the wing to pass under the spoiler and blend with the flow passing out of the two slots which are opened through the wing when the flap 57 and slot controller 65 are in the positions shown in Fig. 5.

When the flap 57 is in raised position, as shown in Fig. 6, the deflector 60 serves as a gate for closing the bottom of the slot between the flap 57 and the forward portion 55 of the airfoil. The slot controller 65 closes the upper end of the slot, but the spoiler 69 can be moved into lowered or raised position independently of any movement of the flap 57 or the other part of the slot controller 65.

When the spoiler 69 is raised, as shown in Fig. 6, the upper part of the slot is partly open, but this is not objectionable because the purpose of the raised spoiler 69 is to create a turbulence of the air flow above the wing, and there is, therefore, no disadvantage in having the continuous surface of the top of the wing profile interrupted. No air passes through the slot since the lower end of the slot remains closed by the deflector 60.

Fig. 7 is a sectional view taken through a different portion of the airfoil of Fig. 5, and illustrating the mechanism by which the spoiler 69 is raised and lowered independently of the position of the flap and slot controller. The spoiler is operated by the pilot through a control rod 71' which is connected with a bell crank 72' by a pivot 73. The axis of the pivot 73 is in alinement with the axis of the pivot 66 (Fig. 5) on which the slot controller 65 rocks as the flap is depressed. Because of this alinement between the axis of the pivots 73 (Fig. 7) and the axis of the pivot 66 (Fig. 5), rocking movement of the slot controller causes little or no movement of the control rod 71' and bell crank 72' at the pivot 73.

The bell crank 72' is connected to the slot controller 65 by a fulcrum pivot 75, and the rearward end of the bell crank is connected to the spoiler 69 by a link 76. From this construction it is apparent that longitudinal movement of the control rod 71' will raise or lower the spoiler 69 regardless of this position of the flap 57 or the slot controller 65.

In the preferred construction of the invention, the spoiler 69 is made up of a number of sections which extend along successive spanwise sections of the slot. This construction is shown in Fig. 8. Each of the sections of the spoiler 69 is operated by a control rod 71' through bell crank-and-link connections which are the same for all sections. However, it is preferable to have the different sections of the spoiler 69 operate successively so that the spoilers can be used to produce aileron effects for stabilizing the aircraft.

The operating mechanism shown in Fig. 9 includes a crankshaft 78 extending spanwise within the forward portion 55 of the wing, with cranks at different phase angles so that when the first crank is extending downwardly, the next crank extends forwardly at an angle of 45° and the third crank extends substantially horizontally. As the crankshaft begins to move counterclockwise in Fig. 8, the first crank will impart movement to its spoiler section substantially commensurate with the actual displacement of the crankpin, whereas the third crank which is moving at right angles to the direction of its control rod 71', will impart substantially no movement to its spoiler section. The second crank will move its spoiler section much less than the first crank because of the angular relation between the second crank and its control rod 71'.

As the crankshaft turns through a quarter revolution, the spoiler sections are raised sucessively starting from the tip end of the wing. This operating mechanism is disclosed and claimed in my copending application Serial No. 587,301, filed April 9, 1945, and now Patent No. 2,635,837.

Fig. 10 shows a modified construction in which a flap 80 is connected by a pivot 81 to a bracket 82 extending rearwardly from a rigid forward section 83 of an airfoil. The flap is raised and depressed by longitudinal movement of an operating rod 85.

There is a deflector 87 movable downwardly into a position for creating an increase in pressure below the slot which is opened between the flap 80 and the forward portion 83 when the flap is depressed. Unlike the deflectors illustrated in the earlier figures of the drawing, the deflector 87 swings forwardly as it moves into its depressed position, whereas the deflectors shown in the other views swing rearwardly as they move downward.

The deflector 87 is operated automatically from the flap 80 by a link 90 connected to a rocker arm 91 which swings on a fulcrum pivot 92 carried by the rigid forward portion 83 of the wing. The flap 80 is connected to the rocker arm 91 by a link 94. As the flap is raised, the link 94 moves the rocker arm 91 counterclockwise and pushes the lower link 90 rearwardly so that the deflector 87 swings counterclockwise about a pivot 96 which supports it from the flap.

When the flap 80 is moved into its raised position, as shown in Fig. 11, the deflector 87 is returned to a recess 97 in the bottom surface of the flap 80. When retracted into this recess 97, the deflector 87 is within the airfoil profile and the lower surface of the deflector comprises a part of the wing profile.

Fig. 12 shows another modified construction in which the deflector is much larger and the construction comprises a split flap. A flap 100 is connected by a pivot 101 to a bracket 102 of a rigid forward section 103 of an airfoil. This flap is raised and depressed by an operating rod 105 in the same manner as the flaps previously described. A deflector 107 is connected with the flap 100 by a pivot 109, and when the deflector 107 is swung rearwardly as far as possible about the pivot 109, the deflector fits against the bottom surface of the flap 100.

A link 111 connects the deflector 107 to the rigid forward section 103 at a location above the pivot 101 so that as the flap 100 is depressed, the deflector 107 is pulled forward in proportion to the flap deflection. Although the deflector 107 extends downwardly and rearwardly in contrast to the other deflectors which extend downwardly, this deflector 107 is larger in proportion to the size of the flap and, therefore, is of greater downward extent than the other deflectors. Because of its larger size, it creates an increase in the air pressure below the slot which can be made equal to that produced by the downwardly and forwardly extending deflectors shown in the previous figures of the drawing.

Fig. 13 illustrates the application of the invention to a wing slot having no flap. This figure shows an airfoil 115 with a slot 116 through which air can flow from the lower to the upper surface of the airfoil. This slot 116 may be located at various regions chordwise of the airfoil, either forwardly or rearwardly of the location at which it is shown in Fig. 13 merely by way of illustration.

When the airfoil 115 is in flight, the lower end of the slot 116 is closed by a deflector element 118 which occupies the position indicated by the dotted line 118', and in this position the deflector element comprises a closed gate to prevent air from entering the slot 116. The upper end of the slot 116 is closed by a slot controller 120.

When the pilot wishes to open the slot 116, he pushes rearwardly an operating link 121 which rocks a bell crank 122 about a fulcrum pivot 123 that supports the bell crank from the wing structure. This rocking movement of the bell crank 122 pushes a link 125 by which the other end of the bell crank is connected with the deflector 118. This movement of the link 125 lowers the deflector 118 into various positions below the wing profile depending upon the extent of rocking movement imparted to the bell crank 122.

The slot controller 120 is operated automatically to open the top of the slot in proportion to the extent to which the deflector 118 has been depressed below the wing profile. This automatic movement of the slot controller 120 is effected by a link 127 connecting the slot controller with the rearward end of a lever 128 which supports the deflector 118. This lever 128 rocks about a fulcrum pivot 129.

Fig. 14 shows another modified construction in which a flap 130 is connected by a pivot 131 to a bracket 132 extending rearwardly from a rigid forward section 133 of an airfoil. A deflector 136 is connected with the flap by a lever 137 which swings about a pivot 138 that connects the lever 137 to the flap. The upper end of the lever 137 above and rearwardly of the pivot 138 is connected to a deflector operating link 140.

This operating link 140 can be actuated to move the deflector 136 up and down regardless of the position of the flap 130. In all of the other modifications described above, the operation of the deflector was effected automatically in proportion to the depression of the flap. In the modification shown in Fig. 14 the movement of the deflector is under the control of and may regulated by the pilot at all times and is not only be dependent upon the position of the flap. It will be understood that various modifications shown in the other figures can also be equipped with operating mechanism such as shown in Fig. 14 for moving the deflectors under the operator's control instead of automatically from the flap when control by the pilot is preferred to automatic control.

The deflector operating link 140 is connected with a bell crank 142 at a pivot 143 and there is a pin or roller at the pivot 143 extending into a slot 144 which confines the movement of the pivot 143.

The bell crank 142 is connected by a pivot connection 146 to a plate 147 which rocks about a fulcrum pivot 148 that supports the plate from the bracket 132. The pilot rocks the plate 147 about its fulcrum pivot 148 by imparting longitudinal movement to a pull rod 150.

Forward movement of the rod 150 rocks the plate 147 counterclockwise in Figure 14 and pulls the link 142 downward so that the pivot 143 is moved downward in its slot 144 and the deflector-operating link 140 is pushed down and made to rock the lever 137 clockwise about its pivot 138. The deflector 136 is thus moved upwardly toward raised position. Movement of the pull rod 150 in the opposite direction depresses the deflector 136.

A slot controller 152 is supported from the bracket 132 by a pivot 154; and this slot controller is moved, in proportion to the deflection of the flap 130, by a link 156 connecting the slot controller to the flap.

There are guide plates 158 carried by the deflector 136. These guide plates are for the same purpose as the plates 27 described in Figs. 1 to 4 and the plates 158 are shaped to conform to the contour of the slot controller and the leading edge of the flap so that when the flap and deflector are raised the plates fit within the wing profile. There are slots, indicated by the dotted line 160, in rigid forward ends of the guide plates 158.

The preferred embodiment and a number of modifications of the invention have been illustrated and described, but changes and modifications can be made, and some features can be used alone or in different combinations without departing from the invention as defined in the claims.

What is claimed is:

1. An aircraft wing having a spanwise extending slot therein, a deflector within the wing profile, hinge means connecting said deflector to the wing, the hinge means having a spanwise pivot axis rearward of the slot, the entire extent of the deflector being movable downwardly about this hinge means into a position in which at least the lower portion of the deflector extends downwardly below the wing profile to deflect the air flow at a point immediately beneath the slot, and the upper end of which is at least as far rearward as the foremost part of the rearward wall of the slot, the hinge means being of substantial length and attached to the deflector at a distance from the pivot axis of the hinge means, and holding the deflector, when in its downward position, spaced from the bottom surface of the wing whereby a bleed passage is provided through which some of the upwardly deflected air escapes between the top of the deflector and the wing and flows from said bleed passage under the part of the wing rearward of the deflector.

2. An airfoil comprising a rigid forward portion, a flap, hinge means connecting the flap to the rearward end of the rigid forward portion of the airfoil at such a location that a slot is opened between the flap and the forward portion when the flap is depressed, an apparatus for pressurizing the air below the slot, said apparatus including a deflector connected to the airfoil and movable between raised and lowered positions, said deflector being located within the airfoil profile when in raised position, hinge means having a spanwise pivot axis rearward of the slot connecting the deflector to the airfoil, the entire extent of said deflector being movable downwardly simultaneously about the axis of the hinge means and into a lowered position in which the deflector extends downwardly below the bottom surface of the forward portion of the airfoil with the chord line of the deflector extending in a direction to intersect the flap at a substantial distance rearward of the leading edge of the flap, the portion of the flap ahead of the point of intersection of said chord line and the flap having a surface which is curved over a substantial portion of its total area, and with a convex surface for at least that portion of the curved area nearest to said point of intersection, said deflector having a clearance between its upper end and the flap providing a bleed passage for part of the air that is directed upward by the deflector.

3. An airfoil comprising a forward section, a flap, hinge means connecting the flap to the rearward end of the forward section and having a slot between the forward section and the flap when the flap is depressed, a deflector element, and a hinge having a pivot axis located rearwardly of the leading edge of the flap, said hinge connecting the deflector element to the airfoil and the deflector element being movable about said axis between raised and lowered positions, said deflector element being located within the airfoil profile when in a raised position, and said deflector element when in lowered position extending forwardly from the hinge and being spaced throughout its length from the bottom profile of the airfoil and below the entrance to the slot and in a direction to have an extension of the chord line of the deflector intersect the flap at a distance rearward of the leading edge of the flap, the portion of the flap ahead of the point of intersection of said chord line and the flap having a surface which is curved over a substantial portion of its total area, and with a convex surface for at least that portion of the curved area nearest to said point of intersection, and operating mechanism for the deflector connected with the flap and movable with the flap to lower the deflector element as the flap is depressed.

4. An airfoil including a forward section and a rearward section comprising a flap with a leading edge, and having a clearance between the flap and the forward section when the flap is depressed, an air deflector having a rounded leading edge and located between the flap and the forward section in position to divide the clearance into two slots through which air flows from below the airfoil to the top surface above the flap, and a deflector element connected to the airfoil by a hinge connection having a pivot axis located rearwardly of the leading edge of the flap and about which the deflector element is movable from a position within the airfoil profile to a lowered position extending forwardly and downwardly under both of the slots, and in position to deflect air upward below both of the slots and into said slots and into impingement with the forward portion of the flap, the upper end of the depressed deflector element being spaced from the flap to provide a bleed passage from which air passes under the flap and being located rearward of the leading edge of the flap, and the lower and forward surface of the flap ahead of the upper end of the deflector having a surface which is curved over at least a portion of its area and the entire surface which is curved being of convex curvature.

5. An aircraft wing having a spanwise extending slot therein, a deflector within the wing profile, hinge means having a pivot axis rearward of the slot and connecting said deflector to the wing, the deflector being movable angularly about this pivot axis of the hinge as a center into a lowered position in which the deflector extends forwardly and downwardly below the wing profile and into the air stream below the wing to deflect the air upwardly from immediately below the slot, said hinge means being of substantial length and attached to the deflector at a distance from the pivot axis of the hinge and with the upper edge of the deflector, when the deflector is lowered, spaced from the pivot axis of the hinge and from the bottom surface of the wing with clearance for a flow of air across the bottom of the wing and between the wing and the deflector, the deflector, when depressed having a chord line that extends along a directional line that intersects a bottom surface of the wing at a substantial distance rearward of the slot, said bottom surface ahead of the intersection being curved over at least a portion of its area and the curvature of the entire curved area being convex.

6. The combination with an airfoil having a spanwise extending slot opening through it for the flow of air from the bottom to the top of the airfoil, and having a bottom surface area that extends up into the slot to form the back of the slot, or a deflector extending along at least a substantial portion of the slot, and a pivot connection between the deflector and the wing, located rearward of the slot and on which the deflector is movable between raised and lowered positions, the deflector when in raised position being located within the profile of the wing, and the deflector when in lowered position being located with its chord line extending along a directional line that intersects the bottom surface of the wing rearward of the back of the slot, and said deflector being located below and spaced from said bottom surface of the wing and below the slot in position to deflect air upward into impingement with the bottom surface ahead of its area and the curvature of the entire curved area being convex.

7. The combination with an airfoil having a forward section, with a swept back trailing edge, and a second section hinged to the rearward end of the forward section along a swept back slot extending through the airfoil and through which air flows from the bottom to the top surface of the airfoil at the trailing edge of the forward section, of guide plates located in the slot, there being a plurality of guide plates connected with said forward section and spaced from one another along the swept back trailing edge of the forward section, and there being a plurality of other guide plates carried by the second section and spaced along the length of the slot, and overlapping the guide plates of the forward section, all of said guide plates extending substantially chordwise to restrain tipwise slip of the airstream that passes through the slot.

8. The combination with an airfoil having a slot for the flow of air from the lower to the upper surface of the airfoil, and having a rounded leading edge at the back of the slot, of a spoiler pivotally connected to the top of the airfoil and movable on the pivot connection into a raised position ahead of the slot, a deflector at the bottom of the airfoil, and hinge means connecting the deflector to the airfoil, the hinge means having a pivot axis rearward of the slot and about which the deflector swings between raised and lowered positions, said deflector when in raised position being located substantially in line with the airfoil, and said deflector when in lowered position being spaced from the bottom of the airfoil and having its chord line extending along a directional line that intersects the airfoil at a substantial distance rearward of said leading edge.

9. An aircraft wing having a forward portion, a flap having a rounded leading edge, hinge means connecting the flap to the rearward end of the forward portion by connections that provide a slot between the flap and the forward portion when the flap is depressed, a spoiler at the top of the wing and within the wing profile, a pivot connection between the spoiler and the wing and on which the spoiler is movable upwardly to a location in front of the slot in position to deflect air upwardly, a deflector within the wing profile, a pivot connection between the deflector and the wing and rearward of the leading edge of the flap and on which the deflector is movable downwardly into a position spaced below the wing profile and extending forward below the slot and with the chord of the deflector along a directional line that intersects the flap at a substantial distance rearward of the leading edge of the flap, for deflecting air upwardly to the slot and against the forward portion of the flap, operating mechanism for the deflector responsive to movement of the flap to move the deflector upwardly and downwardly, and other operating mechanism for the spoiler operable independently of the flap and of the operating mechanism for the deflector.

10. In an airfoil, a forward portion and a rearward portion, a slot extending from the lower surface of the upper surface of the airfoil and between said forward and rearward portions, a deflector element movable between raised and lowered positions, the deflector element when in raised position extending across the lower end of the slot constituting a part of the lower surface of the airfoil, said deflector element when moved into its lowered position extending below the lower surface of the airfoil and being in spaced relation to both the forward and rearward portions of the airfoil and in angular relation to the lower surface of the airfoil, the upper end of the deflector element, when in lowered position, being rearward of the lower end of the slot so that at least a portion of the air deflected by said deflector element impinges against the lower surface of the rearward portion of the airfoil, the surface of said rearward portion against which the air impinges being curved over at least a portion of its area and the entire surface of the curved area being of convex curvature.

11. The combination with an airfoil having a slot therein, of a deflector movable between raised and lowered positions and comprising a part of the bottom surface of the airfoil when in raised position, hinge means connecting the deflector to the airfoil, the hinge means having an axis rearward of the slot entrance and about which the deflector swings downwardly into its lowered position in which at least the major portion of the deflector is below the airfoil profile, the deflector being connected to the hinge means at sufficient distance from said axis to leave a bleed slot between the upper end of the deflector, and the surface of the airfoil above the deflector, the deflector being located in position to deflect an airstream upwardly into the slot and against a portion of the bottom surface of the airfoil rearward of the slot, the lowered deflector and said bottom surface being in such positions with respect to one another that a portion of the deflected air passes out through the bleed slot.

References Cited in the file of this patent

UNITED STATES PATENTS

| | | |
|---|---|---|
| 1,841,804 | Hall | Jan. 19, 1932 |
| 1,877,474 | Burkhart | Sept. 13, 1932 |
| 2,117,607 | Griswold, 2d | May 17, 1938 |
| 2,261,363 | Griswold, 2d | Nov. 4, 1941 |
| 2,276,522 | Staufer | Mar. 17, 1942 |
| 2,289,704 | Grant | July 14, 1942 |
| 2,366,751 | Read | Jan. 9, 1945 |
| 2,368,205 | Diehl | Jan. 30, 1945 |
| 2,466,466 | Morrisson | Apr. 5, 1949 |
| 2,507,611 | Pappas et al. | May 16, 1950 |
| 2,668,027 | Burnelli | Feb. 2, 1954 |

FOREIGN PATENTS

| | | |
|---|---|---|
| 478,190 | Great Britain | Jan. 10, 1938 |
| 846,337 | France | June 5, 1939 |